Dec. 17, 1963 R. C. KIRKHAM 3,114,801
MULTI-LINE TELEPHONE STATION
Filed June 15, 1959
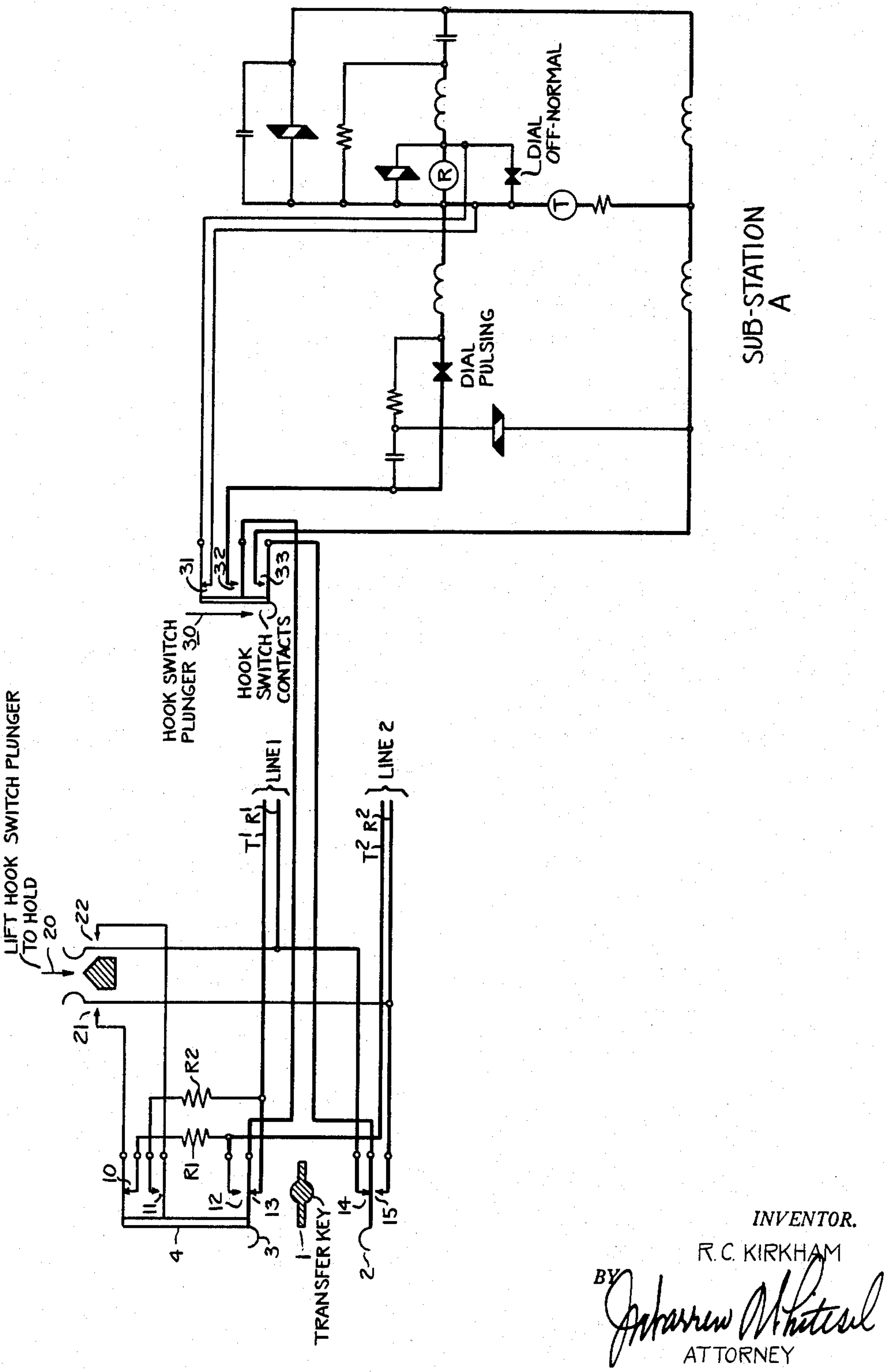
INVENTOR.
R. C. KIRKHAM
BY Johnson Whitesel (signature)
ATTORNEY United States Patent Office 3,114,801
Patented Dec. 17, 1963

3,114,801

MULTI-LINE TELEPHONE STATION

Robert C. Kirkham, Park Forest, Ill., assignor to International Telephone and Telegraph Corporation, New York, N.Y., a corporation of Maryland Filed June 15, 1959, Ser. No. 820,400
12 Claims. (Cl. 179—99)

This invention relates to telephone subscriber stations and more particularly to multiple-line telephone stations.

It is old to provide telephone sets or subscriber stations having keys which may be used for selectively making telephonic connections between such station and one of a plurality of lines and for thereafter switching said telephonic connections between said lines during a call. For example, a calling subscriber may reach a called subscriber on one line and during conversation questions may arise requiring information from a third or non-conversing person. The calling subscriber may then operate a key associated with his telephone set to select a second line in order that such third person may be called for information. Meanwhile, the called party is waiting on the first line to resume conversation with the calling subscriber. After having secured information from the third subscriber, the calling subscriber returns to the first line and resumes the original conversation.

Sometimes, it may be necessary to switch back and forth many times between the various lines. Each time that the lines are switched, care must be taken to avoid having an appearance of an on-hook or call terminating condition which might release the connection. In the past it has been common practice for a subscriber to operate a hold key each time that he switches his telephone station between subscriber lines. If he forgets to operate the hold key or operates his keys in an incorrect sequence, it is equivalent to hanging-up and a connection is lost. It is desirable to eliminate unnecessary control of hold keys and automatically to provide hold functions responsive to operation of a switching key that transfers the talking connection.

An object of this invention is to provide a new and improved multi-line subscriber station.

Another object of this invention is to provide a multi-line subscriber station having an automatic hold feature so that a conversing subscriber does not have to operate a hold key repeatedly.

These and other objects are accomplished by means of a hold key at a subscriber station which is manually operated once during a call to connect a balancing or holding network to each subscriber line that is not telephonically connected to the subscriber station. After the hold key is operated, the holding network and talking circuits are automatically transferred in a proper sequence responsive to operation of a switching key, i.e. as the switching key is operated to switch the voice communication path of the subscriber station from line to line, the holding bridge is automatically switched to hold connections over the lines to which the telephone is not connected for voice transmission. At the termination of a call, the hold key is automatically returned to normal responsive to restoration of a receiver or handset on an associated cradle or hookswitch. An operation of hookswitch contacts releases the call to which the telephone is connected for voice transmission but does not release any held calls which may be extended over other lines connected to the telephone station.

The above mentioned and other objects of this invention together with the manner of obtaining them will become more apparent and the invention itself will be best understood, by making reference to the following description of an embodiment of the invention taken in conjunction with the accompanying single sheet of drawings which shows a multi-line telephone station.

Where possible, simple terms are used and specific items are described hereinafter to facilitate an understanding of the invention; however, it should be understood that the use of such terms and references to such items are not to act in any manner as a disclaimer of the full range of equivalents which is normally given under established rules of patent law. For example, the drawing shows a telephone station having access to two lines; whereas, the telephone station may be adapted to connect with any number of telephone lines. Moreover, a hold key is described hereinafter as a lift key associated with a plunger of a handset cradle; whereas, any suitable form of hold key may be provided. Quite obviously, other examples could be selected to indicate the manner in which the terms used and the items described are entitled to a wide range of equivalents.

The following is a description of components that are shown in the drawing. Key 1 is adapted to rotate between the position shown in the drawing and a position at right angles thereto. When key 1 is in the position shown, the contacts are as shown. When key 1 is rotated by 90°, contacts 10, 13 and 14 open while contacts 11, 12 and 15 close. The contacts of transfer key 1 are mounted on leaf springs which may be adjusted to open or close at different points in their excursion as they move responsive to key operation. Usually the time of make or break for contact springs as they move responsive to key operation is determined by such things as the relative spring stiffness, physical spacing of contacts, etc. While the exact configuration of the key is not important, the sequence of contact closure is important. That is, as key 1 is rotated from the position shown in the drawing to a position displaced therefrom by 90°, contacts 11 close first, contacts 13 and 14 open second, contacts 12 and 15 close next and contacts 10 open last. When the key is returned to normal, contacts 10 close first, contacts 12 and 15 open second, contacts 13 and 14 close next and contacts 11 open last.

A typical telephone set has a cradle adapted to receive and support a handset. The cradle has associated therewith two plungers 20 and 30 which are depressed responsive to the weight of the handset when in place. Both of the plungers 20 and 30 normally operate in the usual manner, i.e. both raise and lower responsive to removal or replacement of a handset; depression of either opens hook switch contacts to release a call. However, the plungers differ from normal operation since plunger 20 may be raised manually to a second, higher position where it remains either until the handset is replaced or until lowered manually.

*Circuit Operations*

When a subscriber at substation A removes a receiver or handset, either to receive or to initiate a call, both plungers raise to a normal position responsive to spring tension (not shown). Responsive thereto, hookswitch contacts 31—33 operate thereby completing a talking circuit at contacts 32 and 33 for interconnecting the substation and one of the lines. If it is assumed that the keys are in the position shown in the drawings, a circuit may be traced from conductor T1 through contacts 13, 32, the substation network, and returned over contacts 33, 14, and conductor R1. Also responsive to the removal of the handset, contacts 31 open to break a shunt around receiver R.

Next, let it be assumed that during the conversation over line 1, the subscriber at substation A requires information of another person who may be reached over line 2. First, the subscriber at substation A lifts plunger 20 whereupon contacts 21 and 22 close. Thereafter, the subscriber rotates key 1 by 90° thereby opening contacts 10, 13 and 14 while closing contacts 11, 12 and 15. In view of the above explained contact sequence, a holding bridge is first completed at contacts 11. Next, the telephone is disconnected from both lines to insure against any conversation between subscribers who may be connected to lines 1 and 2, then the telephone is connected to line 2 and finally the bridge is removed from line 2 at contacts 10. In greater detail, equipment connected to line 1 is held by a loop bridging the talking conductors which may be traced from conductor T1 through resistance R2, contacts 11, and 22, to conductor R1. The subscriber at substation A is telephonically connected to line 2 over a circuit which may be traced from conductor T2 through operated contacts 12, 32, the substation network and returned over contacts 33 and 15 to conductor R2. The subscriber at station A may thereafter dial in a normal manner to complete a call to a third party over line 2.

Let it be assumed that the subscriber at substation A wishes to have more information from the subscriber who is waiting on line 1. There is no need to touch plunger 20 at this time since it is already raised. The operator at substation A merely rotates key 1 to the position shown in the drawing. Responsive thereto, contacts 10 close first and contacts 11 open thereafter, thus transferring the holding bridge from line 1 to line 2 via a circuit which may be traced from conductor T2 through resistance R1, contacts 10, 21 and conductor R2. The subscriber at station A is now telephonically connected to line 1 over a circuit which may be traced from conductor T1 through contacts 13, 32, the substation network and return over contacts 33 and 14 to conductor R1. As previously described, the holding bridge is first connected across the line to which the telephone is connected; then, the telephone is disconnected from both lines. Thereafter, the telephone is connected to a second line and finally the holding bridge is removed from the line to which the telephone is now connected. All of this is determined by the sequence in which the contacts of key 1 respond as the contacts travel.

Key 1 may be rotated any number of times during the call without further control of plunger 20. In each key position, one of the resistances R1 or R2 is connected across tip and ring conductors to hold equipment associated therewith while the subscriber is connected to the other line.

When the subscriber at substation A is finished with his conversation, he replaces the handset in its associated cradle; whereupon, plunger 30 operates in the direction of the arrow to restore hookswitch contacts 31—33 thereby electrically breaking the tip and ring conductors at contacts 32 and 33 while reshunting the receiver at contacts 31. The weight of the handset also returns plunger 20 to its normal position thereby disconnecting the holding bridge.

Next, it is assumed that the subscriber at substation A receives a call on line 1, operates hold key 20 and rotates switching key 1 in order to call another subscriber, all as explained above. Further, let it be assumed that the subscriber on line 2 does not have the information which is sought; therefore, it is desirable to release the call which is extended over line 2 and to place a new call over line 2 to a different subscriber in order to get the required information. It may be recalled from the foregoing description that in order to place a call over line 2 while holding line 1, hold key 20 is lifted to close contacts 21 and 22 while transfer key 1 is rotated to open contacts 10, 13 and 14 and to close contacts 11, 12 and 15. With the keys in the described position, the subscriber at station A may manually depress plunger 30 to restore hookswitch contacts 31—33. The tip and ring conductors are opened at contacts 32 and 33 to break the loop across conductors T2 and R2 thereby releasing equipment connected thereto. In the meantime, the holding circuit for line 1 may be traced from conductor T1 through resistance R2, contacts 11, 22, and conductor R1.

When a subscriber at substation A releases plunger 30, contacts 32 and 33 close to complete a loop across the tip and ring conductors, thus seizing automatic switches via line 2. Thereafter, a subscriber at substation A may dial to complete a second call in any well known manner.

Thus, it is seen that a subscriber at station A may hold a call on either line while repeatedly initiating and releasing calls on the other line.

Obviously, the principles described above may be expanded to provide for any number of lines by duplicating certain of the components that are shown in the drawings.

While the principles of the invention have been described in connection with the specific apparatus, it is to be clearly understood that this description is made only by way of example and not as a limitation on the scope of the invention.

I claim:

1. A two line telephone comprising transfer means telephonically connecting said telephone to a first of said lines, holding means comprising a first hold means associated with a first of said two lines, a second hold means associated with a second of said two lines, enabling means, means responsive to the operation of said enabling means for connecting said second hold means to said second line and means responsive to the operation of said transfer means while leaving said enabling means operated, for connecting said first hold means to said first line and for telephonically connecting said telephone to said second line and for disconnecting said second hold means from said second line.

2. The telephone of claim 1 and means comprising two plungers positioned to be depressed by a cradled handset for operating hookswitch contacts, and said enabling means comprising means responsive to manual control of one of said two plungers for enabling said holding means.

3. The telephone of claim 2 and means responsive to manual control of the other of said plungers for releasing said telephonic connection.

4. The telephone of claim 3 and means responsive to cradling said handset for cancelling said manual control.

5. The telephone of claim 2 and means responsive to repeated further operation of said transfer means only for repeatedly transferring said holding means and said telephonic connection between said lines.

6. The telephone of claim 1 wherein said transfer means comprises a key having a plurality of contacts, said contacts having make-break characteristics such that when said transfer means only is further operated first said holding means is connected to said second line, second said telephone is disconnected from both of said lines, third said telephone is connected to said first line and fourth said holding means is disconnected from said first line.

7. A multi-line telephone substation comprising switching means for telephonically connecting one of said lines to said telephone, means individual to each of said lines for holding connections extended over each of said lines, enabling means, means responsive to the operation of said enabling means for connecting an individual one of said hold means to hold connections over the other of said lines, means responsive to operation of said switching means only for transferring said telephonic connections to another of said lines, and means responsive to said last named means for automatically connecting the other of said holding means to the other non-telephonically connected one of said lines and disconnecting said one hold means from the telephonically connected one of said lines.

8. A telephone substation comprising a plurality of telephone lines, means for holding connections extended over said telephone lines comprising bridging means individual to each of said lines, multi-position switching means, means for coupling said individual bridging means to at least one of said lines and for telephonically coupling said telephone to another of said lines when said switching means is in one of said multi-positions, and means responsive to the operation of said switching means only to another of said multi-positions for coupling said individual bridging means to at least said other of said lines and for telephonically coupling said telephone to said one line.

9. The telephone of claim 8 wherein said multi-position switching means comprises a two position switch, said first named coupling means comprises contacts operated by said switch in one of its said positions and said second named coupling means comprising contacts operated by said two-position switch in the other of its said positions.

10. The telephone of claim 9 and means for selectively releasing said telephonically coupled line while holding the other of said lines.

11. The telephone of claim 10 and at least two hookswitch plungers operated responsive to the weight of a handset when in a cradled position, means whereby one of said plungers operates hookswitch contacts for telephonically connecting said telephone with and disconnecting said telephone from an associated one of said lines, and where said first switch comprises the other of said plungers which may be operated to enable said holding means.

12. The telephone of claim 8 wherein said multiposition switching means comprises a plurality of contacts positioned to be operated responsive to the excursion of a manually operated key, said contact positions being such that said individual bridging means is first connected to a line having said telephonic coupling, second said telephone is disconnected from all lines, third said telephone is coupled to said one line and fourth said individual bridging means is disconnected from said one line.

References Cited in the file of this patent

UNITED STATES PATENTS

| | | |
|---|---|---|
| 2,589,180 | Wood | Mar. 11, 1952 |
| 2,769,035 | Droel | Oct. 30, 1956 |
| 2,936,341 | Greshel et al. | May 10, 1960 |

OTHER REFERENCES

Automatic Electric Review, vol. 4, No. 1, March 1935, page 3.

New Developments in Substation Equipment (Catalogue 4037), American Automatic Electric Sales Company, page 3.